Feb. 4, 1941.  H. S. INDGE  2,230,952
MICROLAPPING MACHINE
Filed Jan. 31, 1939  2 Sheets-Sheet 1
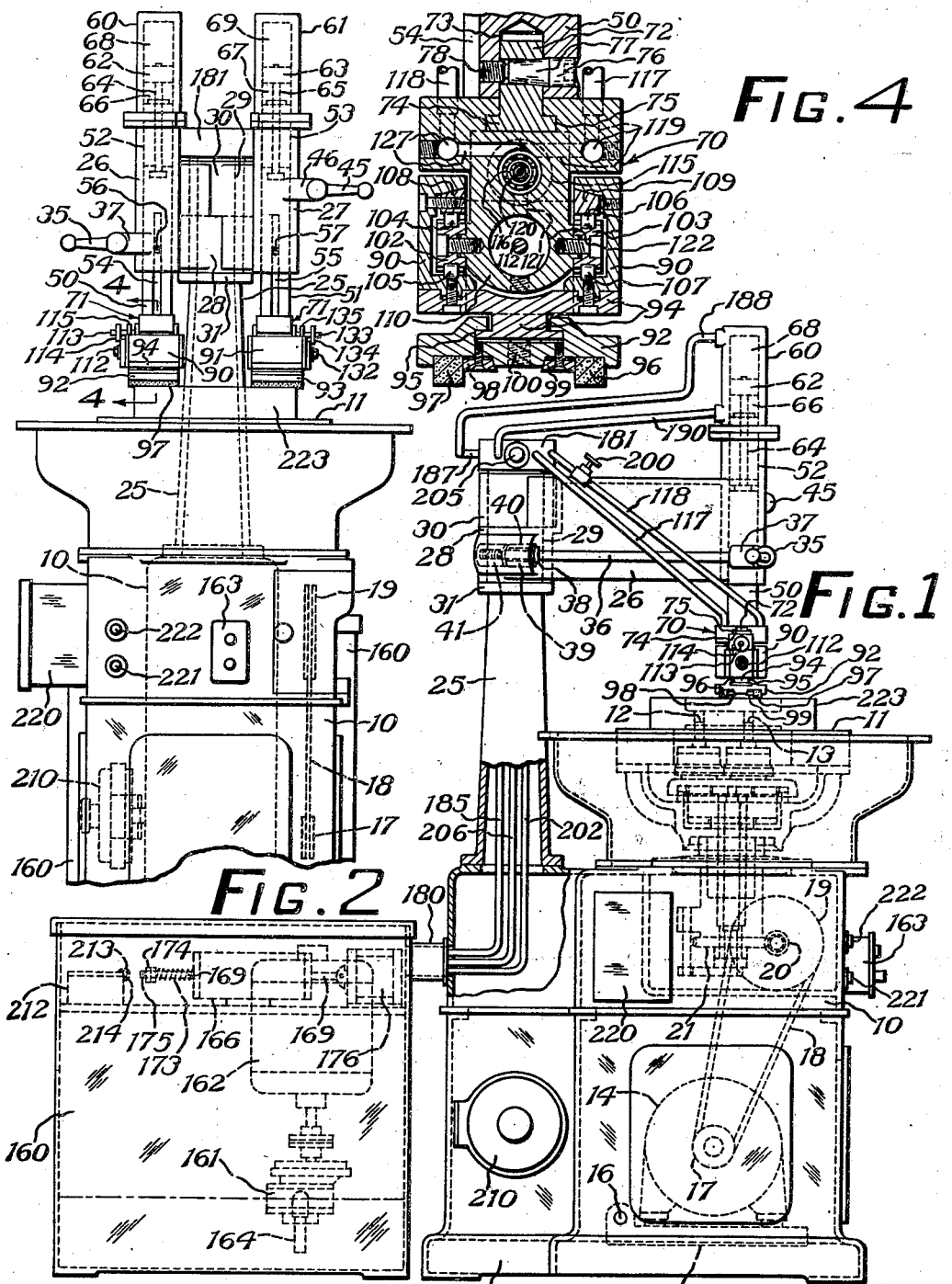
Inventor
HERBERT S. INDGE
By Harold W. Eaton
Attorney Patented Feb. 4, 1941

2,230,952

UNITED STATES PATENT OFFICE 2,230,952

MICROLAPPING MACHINE

Herbert S. Indge, Westboro, Mass., assignor to Norton Company, Worcester, Mass., a corporation of Massachusetts Application January 31, 1939, Serial No. 253,826

3 Claims. (Cl. 51—67)

The invention relates to microlapping machines, and more particularly to a microlapping machine for surfacing plane surfaces, such as the clutch face of an automobile fly wheel.

One object of the invention is to provide a simple and thoroughly practical microlapping machine in which the plane surface of a relatively large work piece may be rapidly surfaced to a plane surface of high quality. Another object of the invention is to provide a microlapping machine in which the work piece is either rotated, or rotated and gyrated in a rotary or irregular path while being lapped or abraded by a plurality of rapidly reciprocating lapping elements.

Another object of the invention is to provide a plate microlapping machine for microlapping a plane surface by means of a hydraulically reciprocated lapping element which is raised and lowered to and from an operating position by a fluid pressure mechanism. Another object of the invention is to provide a microlapping machine for microlapping a plane surface on a work piece of relatively large diameter, such as the clutch face of an automobile fly wheel, by applying rapidly reciprocating lapping elements on diametrically opposite sides of the plane surface while the work piece is being rotated and/or rotated and gyrated. A further object of the invention is to provide a microlapping machine having a plurality of lapping heads each of which is provided with an independently hydraulically reciprocated lapping element and in which each of the heads is moved by an independent hydraulic mechanism, all of which are controlled by a single main control valve. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of the invention, Fig. 1 is a left-hand side elevation, having parts broken away and shown in section to more clearly show the construction;

Fig. 2 is a fragmentary front elevation of the microlapping machine as shown in Fig. 1;

Fig. 4 is a vertical sectional view, on an enlarged scale, taken approximately on the line 4—4 of Fig. 2.

Figure 3:
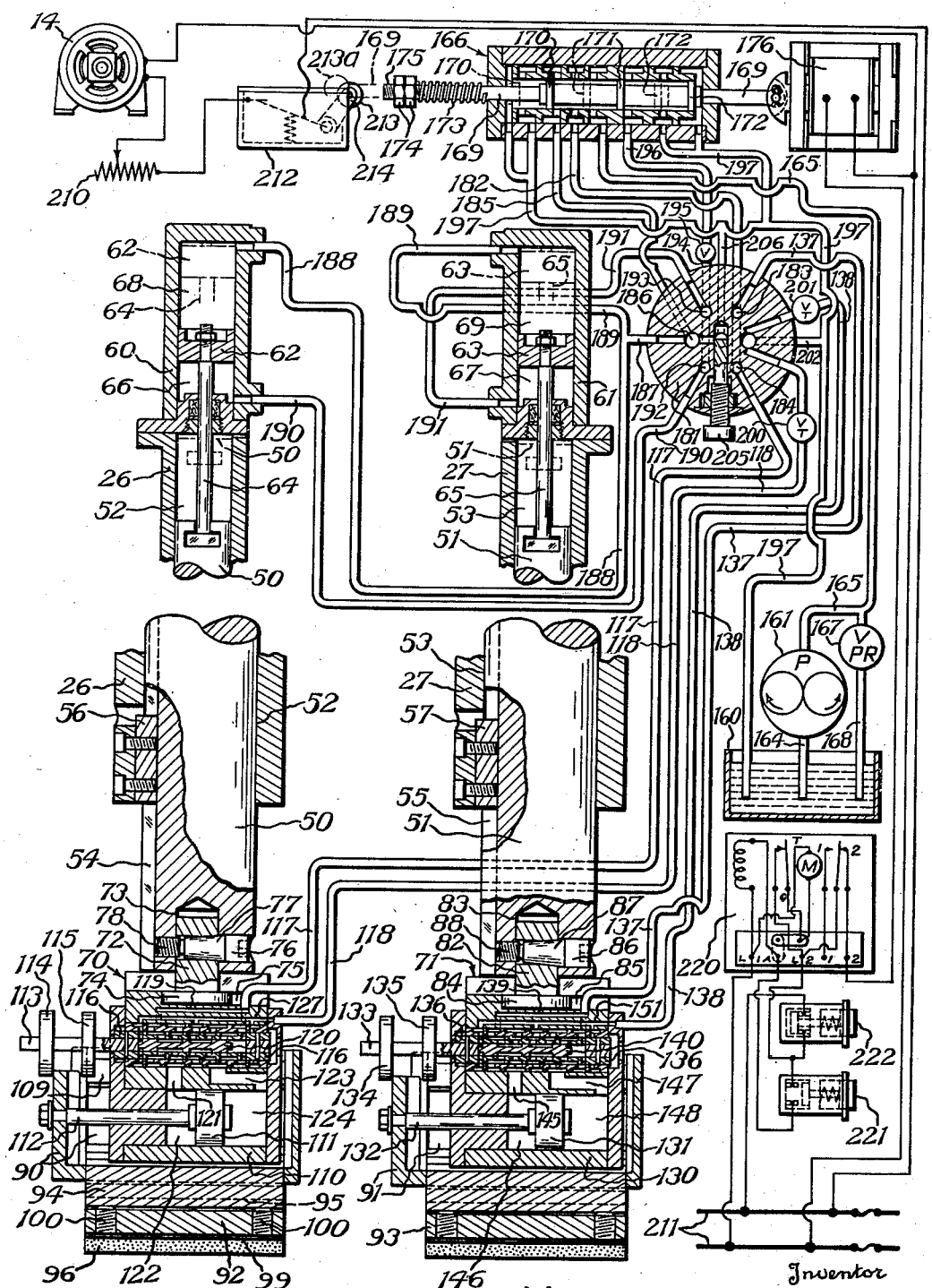
Fig. 3 is a vertical sectional view, on an enlarged scale, through the lapping heads and their supporting spindles and actuating cylinders, combined with a diagrammatic showing of the piping and valve mechanism of the hydraulic system.

The improved microlapping machine has been illustrated in the drawings comprising a base 10 which supports a rotatable work supporting platen 11 together with a plurality of work driving pins or studs 12 and 13 which engage the apertures in the work piece to be lapped or apertures in a fixture for supporting the work piece. The platen 11 is positively driven by means of an electric motor 14 mounted within the base 10. This motor is preferably mounted on a pivotally mounted motor support 15 which is supported on a stud or shaft 16. The motor 14 is provided with a driving pulley 17 which is connected by a driving belt 18 with a pulley 19 which in turn serves to rotate a worm 20 which meshes with a worm gear 21 and serves to drive the work supporting platen 11 and revolve and gyrate the work driving pins 12 and 13 (only two of which have been illustrated, three being preferably utilized) by a mechanism substantially the same as that shown in my prior U. S. Patent No. 1,610,527 dated December 14, 1926. Details of the mechanism for rotating the work supporting platen which in my prior patent is a lapping element and for revolving and gyrating the work driving pins 12 and 13 have not been illustrated in the present case since they in themselves are not considered to be essential features of the present invention. Reference may be had to my prior patent above mentioned for details of disclosure not contained herein.

A rapidly reciprocated abrasive element is supported to engage the upper plane surface of the work piece to lap the same. A vertically extending column 25 is provided to serve as a support for a pair of lap supporting arms 26 and 27. The lap supporting arm 27 is provided with a hub portion 28 which fits on a cylindrical portion 29 at the upper end of the column 25. The lapping arm 27 is provided with a hub portion 30 which is mounted on the cylindrical surface 29 of the column 25. A flange 31 formed on the column 25 serves to position the arm 26 in a vertical position and the arm 26 serves to position the arm 27. Each of the lap supporting arms 26 and 27 is arranged for a springing motion so that they may be adjusted to position the lapping elements to be hereinafter described in the desired position with relation to the work piece to be ground.

Each of the lapping arms is provided with a clamping mechanism whereby the arm may be rigidly clamped in adjusted position to maintain the lapping heads in the desired position with relation to the work piece. Both of the clamping mechanisms are identical in form, consequently only one of these mechanisms has been fully illustrated. A clamp actuating lever 35 is mounted on the forward end of a shaft 36 which is journalled in a boss 37 formed in the lap supporting arm 26. The shaft 36 is provided with a flange 38 which is preferably formed integral therewith. The shaft passes through a clearance hole in a bushing 39 which is slidably positioned within an aperture 40 in the hub portion 28. The end of the shaft 36 is screw threaded and engages or meshes with a nut 41 which is also slidably mounted within the aperture 40. The two bushings are provided with partial cylindrical surfaces adjacent to their inner ends which mate with the cylindrical surface 29 so that when the bushings 39 and 41 are caused to move toward each other by means of movement of the lever 35, the lap supporting arm 26 will be rigidly clamped in adjusted position relative to the column 25.

The lap supporting arm 27 is similarly provided with a clamping mechanism which has not been shown in detail since it is substantially the same as the clamping mechanism just described for the arm 26. A clamping lever 45 is mounted on the outer end of a shaft (not shown) which is in turn journalled in a boss 46 formed integral with the lap supporting arm 27. The remainder of the construction of the clamping mechanism for the lapping arm 27 is identical with the clamping mechanism for the lap supporting arm 26 and consequently has not been illustrated in the present case.

The lap supporting arms 26 and 27 serve as supports for a pair of vertically movable spindles 50 and 51, respectively, which are slidably mounted within apertures 52 and 53, respectively, formed in the forward end of the lap supporting arms 26 and 27, respectively. The spindles 50 and 51 are each provided with keyways 54 and 55, respectively, and the lapping arms 26 and 27 are provided with fixed keys 56 and 57, respectively, so that the spindles 50 and 51 are permitted to slide in a vertical direction but keyed against a rotary motion. The spindles 50 and 51 each serve as a support for a hydraulically reciprocated lapping head to be hereinafter described.

The spindles 50 and 51 are each moved vertically toward and from the work supporting platen 11 by means of an independent fluid pressure mechanism. In the preferred construction a fluid pressure cylinder 60 is mounted on the upper surface of the arm 26 and arranged in axial alignment with the spindle 50. Similarly, a fluid pressure cylinder 61 is mounted on the upper surface of the lap supporting arm 27 and arranged in axial alignment with the spindle 51. Slidably mounted pistons 62 and 63 are provided within the cylinders 60 and 61, respectively. The pistons 62 and 63 are connected by piston rods 64 and 65, respectively, with the lap supporting spindles 50 and 51, respectively. When fluid under pressure is admitted to cylinder chambers 66 and 67 below the pistons 62 and 63, respectively, the pistons together with the spindles 50 and 51, respectively, are moved in a vertical direction to raise the lapping head to an inoperative position. Similarly, when fluid under pressure is admitted to cylinder chambers 68 and 69, the pistons 62 and 63, respectively, are caused to move in a downward direction, transmitting a corresponding movement to the spindles 50 and 51, respectively, to position the lapping heads in operative engagement with the work piece to be lapped, and serve to maintain the heads in an operative position during the entire lapping operation.

The pistons 62 and 63 are preferably moved synchronously so that the lapping elements are moved to and from an operative position simultaneously by means of a fluid pressure system to be hereinafter described. The reciprocable lapping elements of the two spaced lapping heads are preferably positioned and arranged to engage the surface of the work on diametrically opposite sides of the work axis so as to equalize the pressure on the work during the lapping operation and thereby prevent any tendency to tip the work piece from its normal operative path, thus facilitating the production of microlapped plane surfaces which are extremely accurate and of a high quality surface.

An independent lapping head 70 and 71 is mounted on the lower end of each of the lap supporting spindles 50 and 51, respectively. The heads 70 and 71 are preferably removably mounted so that they may be readily dismounted when desired. The lapping head 70 is detachably mounted on the lower end of the spindle 50 by means of a stud 72 which fits within an aperture 73 in the lower end of the spindle 50. The stud 72 is provided with an enlarged round head 74 which lies within a substantially T-shaped slot 75 in the lapping head 70. A stud 76 passes transversely through a transverse aperture in the lower end of the spindle 50 and is provided with a frusto-conical portion 77 which engages a transversely extending hole in the stud 72. The stud 76 is provided with a threaded portion 78 at its other end which engages a threaded hole in the spindle 50. By tightening the stud 76, the stud 72 together with the lapping head 70 may be locked rigidly in position relative to the spindle 50.

Similarly, the lapping head 71 is held in an operative position on the lower end of the spindle 51 by means of a stud 82 which fits within a central vertically extending aperture 83 within the spindle 51. The stud 82 is provided with an enlarged round head 84 which fits within a transversely extending, substantially T-shaped slot 85. A stud 86 which passes through a transversely extending aperture in the lower end of the spindle 51 is provided with a frusto-conical portion 87 which engages and mates with a transversely extending aperture passing through the stud 82. The other end of the stud 86 has a screw threaded portion 88 which engages a threaded hole in the spindle 51 by means of which the lapping head 71 may be clamped in position on the spindle 51.

Each of the lapping heads 70 and 71 is provided with a reciprocable slide 90 and 91, respectively, which serves as a support for a lapping stick holder 92 and 93, respectively. The under surface of the slides 90 and 91 is provided with a downwardly extending plate having an enlarged head 94 which fits within a T-slot 95 in the lapping stick holders 92 and 93, only the lap stick holder 92 being shown in detail in Fig. 4. The lapping stick holder 93 being identical in construction to lap stick holder 92, it is not deemed necessary to illustrate the same in detail.

A pair of abrasive lapping sticks 96 and 97 are mounted on the under surface of the lapping stick holder 92 and are held in position thereon by means of clamping blocks 98 and 99, respectively. A pair of screws 100 passing through the lap stick holder 92 and bearing upon the enlarged head 94 serve to clamp the lapping stick holder 92 in adjusted position on the reciprocable slide 90.

The slide 90 is preferably substantially U-shaped (Fig. 4) and for convenience of manufacture and assembly is preferably made up of a series of parts which are fastened together by screws to form an integral slide member. The slide 90 is supported by anti-friction bearings or slideways so as to slide freely relative to the lapping head 70. A pair of guide plates 102 and 103 are fastened to the sides of a depending portion of the lap head 70. These projections are grooved along their upper and lower surfaces and serve as guideways for a plurality of rows of roller bearings 104, 105, 106 and 107 so that the slide 90 may reciprocate relative to the head 70 at a comparatively rapid rate of speed.

In order to adjust the bearings so that the slide may move or reciprocate, it is desirable to provide an adjustment for the roller bearing slideway. A pair of gibs 108 and 109 are provided which engage the upper rows of roller bearings 104 and 106. These gibs are adjustable by push and pull screws and engage a tapered surface on the slide 90 so that the anti-friction slideways may be adjusted to allow the slide 90 to reciprocate with the desired amount of freedom.

A fluid pressure operated motor together with a control valve therefor is formed within the lapping heads 70 and 71, respectively. This fluid operated motor for reciprocating the holders 92 and 93 is identical with that shown in the U. S. patent application Serial No. 237,654, filed October 29, 1938, by Wallace H. Wood. The reciprocating mechanism for the slide 90 comprises a cylinder 110 formed within the lapping head 70. A piston 111 is slidably mounted within the cylinder 110 and is connected by means of a piston rod 112 with the slide 90.

A combined reversing and pilot valve is also provided within the lap head 70 and comprises a valve stem 113 having a pair of adjustable collars or dogs 114 and 115 which are arranged to engage a projection on the slide 90. The valve stem 113 is connected to slide a hollow valve stem 116 longitudinally within the lap head 70. The sleeve 116 serves as a pilot valve to reverse the direction of flow of fluid. Fluid under pressure is admitted through a pipe 117 and through passages 119 to the valve 116. Fluid is exhausted from the cylinder 110 and valve 116 through a pipe 118. The pilot valve sleeve 116 is hollow and contains a slidably mounted reversing shuttle valve 120 which serves to admit fluid under pressure through a passage 121 into the cylinder chamber 122 to cause the piston 111 and the slide 90 together with the lap stick holder 92 and the lapping sticks 96 and 97 to traverse toward the right (Fig. 3) or to flow through a passage 123 into a cylinder chamber 124 to cause the piston 111 to move toward the left. The projection on the slide 90 which engages the dogs or collars 114 and 115 serves to throw the pilot valve into its reverse position, thereby changing the direction of flow of fluid to the reverse shuttle valve 116 which rapidly and automatically shifts to change the direction of movement of the lap stick holder 92 and the lapping sticks. By adjusting the dogs or collars 114 and 115 relative to the valve stem 113, the length of the reciprocatory stroke of the lap sticks 96 and 97 may be varied as desired.

The lapping head 71 is similarly provided with a built-in fluid pressure motor and control valve. A cylinder 130 is formed within the head 71 and contains a slidably mounted piston 131 which is connected by means of a piston rod 132 with the reciprocable slide 91. A pilot valve stem 133 is provided with a pair of spaced adjustable collars or dogs 134 and 135 which are arranged to engage a projection of the slide 91 and serve to shift a pilot valve sleeve 136 at each end of a reciprocatory stroke. Fluid under pressure is admitted through a pipe 137 and a passage 139 into the valve sleeve 136.

A reversing shuttle valve 140 is slidably mounted within the hollow pilot valve sleeve 136 and serves to admit fluid under pressure through a passage 145 into a cylinder chamber 146 or to admit fluid under pressure through a passage 147 into a cylinder chamber 148 to reciprocate the slide 91, the lap stick holder 93, and the abrasive lapping sticks supported thereby. Fluid is exhausted from the cylinder 130 and valve 136 through a passage 151 and a flexible pipe 138.

A fluid pressure system is provided for supplying fluid under pressure to raise and lower the spindles 50 and 51 and also to reciprocate the lap stick holders 92 and 93. This system may comprise a reservoir 160 which, as illustrated in Fig. 1, is a separate unit or tank. A fluid pump 161 is mounted therein and is driven by means of an electric motor 162 which is controlled by means of a push button switch 163 mounted on the front of the machine base. The pump 161 draws fluid from the reservoir 160 through a pipe 164 and forces fluid through a pipe 165 to a control valve 166 which is also contained within the upper portion of the reservoir 160. A variable pressure relief valve 167 is connected into the pipe line 165 and serves to exhaust excess fluid under pressure through a pipe 168 which returns the same to the reservoir 160.

The control valve 166 comprises a valve stem 169 having formed integrally therewith valve pistons 170, 171 and 172. The valve stem and the integrally formed pistons 170, 171 and 172 are normally held in a left-hand end position (Fig. 3) by means of a spring 173 which surrounds the left-hand end of the valve stem 169 and is interposed between the outer surface of the valve casing and adjustable nuts 174 which are threaded onto a screw threaded portion 175 of the valve stem. An electric solenoid 176 is connected to the other end of the control valve stem 169 and serves when energized to shift the valve into its right-hand position, such as that shown in Fig. 3.

The control valve 166 together with the motor driven fluid pressure pump is located in the reservoir chamber 160. The pipes from the control valve to the spindle lift cylinders and lap stick reciprocating cylinders pass through a tubular member 180 and up through an aperture in the column 25 through a distributor head or junction box 181 located on top of the column 25. Internal passages within the distributor head 181 convey fluid through pipes to be hereinafter described to the left cylinders 60 and 61 and also to the lap stick reciprocating cylinders 110 and 130. Fluid under pressure passing through the pipe 165 enters a valve chamber located between the valve piston 170 and 171 (Fig. 3) and passes out through a pipe 182 which connects with vertically extending passages 183 and 184 which connect with the flexible pipes 117 and 137 to convey fluid under pressure to the reciprocating motors respectively. At the same time, fluid under pressure entering the valve chamber between the valve pistons 170 and 171 passes out through a pipe 185 which extends up through the column 25 into a vertically extending passage 186 which is connected by a pipe 187. The pipe 187 passes fluid under pressure through a flexible pipe 188 to the cylinder chamber 68 above the piston 62 to cause a downward movement of the piston 62, spindle 50 and lapping head 70. At the same time, fluid under pressure from the pipe 187 passes through a pipe 189 into the cylinder chamber 69 above the piston 63 to cause a downward movement of the piston 63, the spindle 51 and the lapping head 71 simultaneously to move both of the lapping heads downwardly into operative relation with the work piece to be lapped.

During the downward movement of the lap heads, fluid is admitted to reciprocate the lapping sticks to produce the desired lapping operation. During the downward movement of the pistons 62 and 63, fluid is exhausted from the cylinder chambers 66 and 67, respectively, through a pipe 190 and a pipe 191, respectively, which are connected to vertical passages 192 and 193 in the distributor head 181, and passes downwardly through a pipe 194, through a valve 195 and a pipe 196 into the valve chamber located between the valve pistons 171 and 172 and out through a pipe 197 which exhausts into the reservoir 160.

During this same time interval when fluid under pressure is admitted through pipes 117 and 137 to cause the lapping sticks to traverse in one direction, fluid is exhausted from the other side of the lapping stick motor cylinders, through the pipes 118 and 138, respectively, which exhaust passes through needle valves 200 and 201, respectively, and passes downwardly through pipe 202 which connects with the exhaust pipe 197 to convey exhaust fluid back to the reservoir 160.

During the downward movement of the lapping heads, fluid under pressure is applied in the cylinder chambers 68 and 69, respectively, rapidly to move the lapping sticks into operative relation with the work piece to be lapped. Pressure within these cylinder chambers 68 and 69 serves to maintain the lap sticks in operative engagement with the surface of the work being lapped under pressure while the sticks are reciprocated and the work piece moves through its irregular rotary and gyrating path to produce the desired lapping action. It is desirable to provide suitable means for varying the pressure of the lapping sticks on the work during the lapping operation. A needle valve 205 is provided in the distributor head 181 on top of the column 25. This needle valve is connected with a passage which connects with the vertically extending pipe 186 and a passage and pipe 206 so that when it is desired to reduce the pressure of the lapping sticks on the work, the needle valve 205 may be adjusted to by-pass part of the fluid pressure passing through the passage 186 in the distributor head 181, through the needle valve 205 and pipe 206 which connects with the pipe 197 and returns the by-passed fluid to the reservoir 160. By manipulation of the needle valve 205, the lap sticks may be maintained in operative engagement with the surface being lapped at the desired pressure.

The needle valves 200 and 201 are provided in the exhaust pipe lines 118 and 138, respectively, from the hydraulic motors on the lapping heads 70 and 71, respectively, to facilitate the independent adjustment of the reciprocatory speed of the lap stick holders and lapping sticks on each of the lapping heads 70 and 71, respectively. By manipulation of the needle valves 200 and 201, the lap sticks on both heads may be caused to reciprocate at the same or at different speeds, as is required.

The motor 14 for producing a combined rotary and gyrating movement of the work piece is preferably a variable speed motor the speed of which is controlled by a rheostat 210. The motor and rheostat are illustrated diagrammatically as connected to the power lines 211. A normally closed limit switch 212 is connected in series with the rheostat 210 and serves in the position illustrated diagrammatically in Fig. 3 to close the circuit and to maintain it in a closed condition during the lapping operation. The limit switch 212 is provided with an actuating roller 213 mounted on the upper end of a pivotally mounted actuating lever 214. The roller 213 is in the path of the left-hand end of the valve piston stem 169 and is preferably positioned so that when the solenoid 176 is deenergized and the released compression of the spring 173 shifts the valve stem 169 toward the left, the end of the valve stem engages the roller 213 and shifts it into position 213a, thereby opening the switch 212 and breaking the circuit to stop the motor 14 and thereby stop the rotary and gyrating movement of the work piece and its supporting and driving members.

To facilitate operation of this improved lapping machine, it is desirable to provide an automatic control mechanism whereby the duration of the lapping operation may be automatically continued for the predetermined time interval. An electric time delay relay 220 (Fig. 2) is mounted on the machine base 10. This electrical time delay relay has also been indicated diagrammatically in Fig. 3 and may be any of the standard electrical time delay relays. The relay illustrated in the drawings is known as the Microflex instantaneous reset timer, manufactured by the Eagle Signal Corporation of Moline, Illinois, under U. S. Patent No. 1,794,762.

A starting push button type switch 221 is provided for tripping the electric time delay relay 220 to start a lapping cycle, after which the lapping heads 70 and 71 approach the work and the lap elements reciprocate at a comparatively fast rate while the work piece is rotated and gyrated for a predetermined time interval. When the time delay relay 220 is started, this serves to energize the solenoid 176 to shift the control valve 166 into the position illustrated in Fig. 3. This movement starts the downward movement of the lap heads 70 and 71 and also starts the reciprocation of the lapping sticks. At the same time the valve stem 169 is shifted toward the right, the normally closed limit switch 212 is closed to start the rotation of the motor 14 which in turn serves to rotate and gyrate the work through an irregular path. The push button 221 is of the instantaneous type and is merely held in a closed position for an instant to start the time delay relay 220 in operation.

It is desirable to provide a means for stopping the lapping cycle at any point during the lapping operation in case it is necessary. A push button instantaneous type switch 222 is provided which is connected with the electric time delay relay 220 in such a manner that the circuit is broken and the relay 220 immediately resets itself, thereby deenergizing the solenoid 176, and the released compression of the spring 173 returns the valve stem 169 toward the left to raise the lapping heads 70 and 71, to stop the reciprocation of the lapping sticks, and also to open the limit switch 212 to stop the rotation of the electric motor 14, thereby stopping the rotary and gyrating movement of the work piece being lapped. An adjustable needle or throttle valve 195 is provided to control the exhaust of fluid from the cylinder chambers 66 and 67, respectively, so as to control the rate of downward movement of the lapping heads 70 and 71.

The operation of this machine will be readily apparent from the foregoing disclosure. Assuming all of the valves have been previously adjusted to the required extent, and the length of the reciprocatory stroke of the lap sticks has been adjusted by means of adjustment of the dogs or collars 114, 115 and 134 and 135, a work piece 223 is placed in position on the work supporting platen 11 with the pins 12 and 13 engaging apertures in the work piece 223. The push button switch 221 is then closed to start the time delay relay 220 which immediately energizes the solenoid 176 to shift the control valve 166 toward the right. This shifting of the control valve 166 serves to admit fluid under pressure to cause a downward movement of the lapping heads 70 and 71 into an operating position and at the same time admit fluid under pressure to start the reciprocation of the abrasive lapping sticks. The shifting of the control valve 166 toward the right also serves to close the limit switch 212 to start rotation of the motor 14 and start a rotary and gyrating movement of the work piece 223 for a lapping operation. The lapping operation proceeds for a predetermined time interval as determined by the setting of the time delay relay 220. After said time interval has elapsed, the relay breaks a circuit to deenergize the solenoid 176 which in turn releases the compression of the spring 173 to return the control valve 166 toward the left which in turn opens the limit switch 212 to stop the rotation of the motor 14 and also to admit fluid under pressure to raise the lapping heads 70 and 71 and to stop the reciprocation of the abrasive lapping sticks.

While the illustration in the drawings shows a work piece 223 mounted directly on the work platen, with the driving pins 12 and 13 engaging apertures in the work piece, if desirable this arrangement may be modified and an adapter placed in position on the platen 11 with apertures engaging the driving pins 12 and 13 and the work piece mounted on the adapter.

It will thus be seen that there has been provided by this invention apparatus in which the various objects hereinabove set forth together with many thoroughly practical advantages are successfully achieved. As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. In a lapping machine having a base, a rotatable work supporting platen, a work driving mechanism associated therewith which is arranged to give the work piece a plurality of positive and definite rotary and gyrating movements during each rotation of the work supporting platen, a vertically movable spindle, a hydraulic piston and cylinder to actuate said spindle, a lapping head on said spindle including a fluid pressure actuated motor, a horizontally movable lap holder having a plurality of abrasive lapping elements thereon, connections between said lap holder and said head whereby a reciprocatory movement is transmitted by the motor to said lapping elements, and a fluid pressure system including a control valve simultaneously to admit fluid to said spindle cylinder and said lap head motor simultaneously to move said lapping elements into operative position and to reciprocate the lapping elements relative to said head.

2. In a lapping machine having a base, a rotatable work supporting platen, a work rotating mechanism associated therewith to impart a rotary motion to a work piece supported on said platen, a vertically movable spindle, means including a hydraulic piston and cylinder to raise and lower said spindle, a lapping head on said spindle comprising a fluid motor, a reciprocable lapping element on said head, connections between said element and said motor rapidly to reciprocate said lapping element, a control valve operatively connected simultaneously to admit fluid to said spindle cylinder and said lap head motor, electrically operated means to shift said valve to initiate a lapping operation, and means including a time delay relay operatively connected to actuate said mechanism so as to shift said valve and terminate the lapping operation after a predetermined time interval.

3. In a lapping machine having a base, a rotatable work supporting platen, a work rotating mechanism associated therewith to impart a rotary motion to a work piece supported on said platen, means including an electric motor to rotate said platen and mechanism and actuate said mechanism, a vertically movable spindle, means including a hydraulic piston and cylinder to move said spindle toward and from said platen, a lapping head including a fluid motor, a reciprocable lapping element on said head, connections between said motor and lapping elements rapidly to reciprocate said elements, means including a switch to stop and start said electric motor, a control valve simultaneously to control the admission to and exhaust of fluid from said spindle cylinder and lap element motor, a spring normally to hold said control valve in an inoperative position, said switch being held open by said valve in its normal position, and an electrically operated control mechanism including a time delay relay and a solenoid controlled thereby to shift said control valve to an operative position to admit fluid under pressure to cause said lapping head to move to an operative position and to start said lap reciprocating motor, said time delay relay serving to allow the lapping operation to proceed for a predetermined time interval and said motor switch being arranged to automatically close when the valve is shifted to an operating position to start the rotary movement of said platen and work rotating mechanism.

HERBERT S. INDGE.